ABSTRACT

United States Patent [19]
Piro et al.

[11] Patent Number: 5,993,511
[45] Date of Patent: *Nov. 30, 1999

[54] PROCESS OF PREPARING NICKEL CERMET

[75] Inventors: Giampietro Piro, Milan; Maria Federica Gagliardi, Castellanza, both of Italy

[73] Assignee: Enricerche S.p.A., San Donato Milanese, Italy

[ * ] Notice: This patent issued on a continued prosecution application filed under 37 CFR 1.53(d), and is subject to the twenty year patent term provisions of 35 U.S.C. 154(a)(2).

[21] Appl. No.: 08/686,067

[22] Filed: Jul. 24, 1996

[30] Foreign Application Priority Data

Aug. 4, 1995 [IT] Italy .................................. MI95A1729

[51] Int. Cl.$^6$ .................................................. C22C 29/12
[52] U.S. Cl. .................................. 75/416; 75/235; 75/628
[58] Field of Search ............................... 75/235, 416, 628

[56] References Cited

U.S. PATENT DOCUMENTS 5,261,944  11/1993  Lockhart et al. ........................... 75/628

FOREIGN PATENT DOCUMENTS 0 525 844   2/1993   European Pat. Off. .

OTHER PUBLICATIONS

Kiyoshi Okumura, et al., Extended Abstracts, vol. 93/1, pp. 1656 and 1657, Jan. 1, 1993, "Microstructure and Overvoltage Characteristics of the Anode for Solid Oxide Fuel Cells".

Tatsuya Kawada, et al., J. Electrochem. Soc., vol. 137, No. 10, pp. 3042–3047, Oct. 1, 1990, "Characteristics of Slurry–Coated Nickel Zirconia Cermet Anodes for Solid Oxide Fuel Cells".

*Primary Examiner*—Melvyn Andrews
*Attorney, Agent, or Firm*—Oblon, Spivak, McClelland, Maier & Neustadt, P.C.

[57] ABSTRACT

A nickel cermet containing a metal nickel phase and an yttria stabilized zirconia phase, is prepared by a process comprising: preparing a suspension of the zirconia in demineralized water; preparing a solution of a nickel salt in demineralized water; mixing the nickel solution and the zirconia dispersion; eliminating the water from the mixture to obtain a solid containing particles of the zirconia covered with the nickel salt; calcining the solid under oxidizing conditions to form particles of the zirconia covered with nickel oxide; and reducing the nickel oxide with hydrogen to nickel metal.

10 Claims, No Drawings

PROCESS OF PREPARING NICKEL CERMET

The present invention relates to a nickel cermet and the relative process for its preparation.

The nickel cermet can be used as an anodic material for solid oxide fuel cells (SOFC).

Solid oxide fuel cells (SOFC) using as solid electrolyte a mixture of yttrium oxide ($Y_2O_3$) and zirconium oxide (zirconia) ($ZrO_2$), an anode consisting of a nickel/zirconium oxide and a cathode of lanthanum manganite ($LaMnO_3$), are known in the art. (See Ullmann's Encyclopedia of Industrial Chemistry, Vol. A12, Ed.1989, pages 80–82).

The nickel/zirconium oxide cermet used as anodic material normally consists of a dispersion of metal nickel in zirconium oxide stabilized in cubic crystalline form with yttrium oxide.

Processes for the preparation of this cermet essentially comprise the mechanical dispersion of nickel oxide in stabilized zirconium oxide, followed by the reduction of the nickel oxide to metal nickel. For example, according to the description of U.S. Pat. No. 3,300,344, mixed zirconium and yttrium oxides, obtained by precipitation from a water solution, are shaped with the addition of nickel oxide and carbon in powder form and the nickel oxide is then reduced to metal nickel by effect of the carbon at a high temperature. In addition the article "Morphology and Electrochemistry of Porous Nickel/Zirconium Cermets", (Proceedings of the First Internation Symposium on Solid Oxide Fuel Cells, S. C. Singhal, Ed. 1989, pages 90–98) describes reduction with hydrogen of a mixture of compact powders obtained by co-grinding, with a sphere mill, nickel oxide and stabilized zirconium oxide. Other known techniques are those based on C.V.D. (Chemical Vapour Deposition) and P.S. (Plasma Spraying), described for example by H. Arai in International Symposium on SOFC, Nov. 13–14, 1989, Nagoya, Japan.

The nickel cermets obtained with the processes of the known art are not entirely satisfactory in applications in fuel cells, mainly owing to their incapacity to give the nickel a sufficiently high active area as to offer interesting catalytic properties (A. L. Lee et al., Ind. Eng.Chem.Res., 1990, 29, 766–773).

Another problem derives from the difficulty in obtaining the complete reduction of the nickel oxide particles to metal nickel. S. D. Singhal's article, mentioned above, specifies in fact that particles with a size of more than 3 $\mu$m conserve a NiO nucleus after reduction with hydrogen. As far as the C.V.D. and P.S. techniques are concerned, there are problems relating to both the quality of the material obtained and difficulties in the practical application of the methods themselves in the construction of medium and high power cells.

A process has recently been described in the U.S. Pat. No. 5,261,944, which enables the production of a solid of nickel oxide and stabilized zirconium oxide, in the form of two distinct phases, with a phase distribution at a level of less than 1 $\mu$m. In addition, the nickel oxide contained in this solid can be completely, or almost completely, reduced by means of hydrogen to give a nickel cermet with a submicronic phase distribution and with a high active area of the nickel, thus making the cermet particularly suitable as a material for solid oxide fuel cells (SOFC).

We have now found a process for the preparation of a nickel cermet which enables a product to be obtained with an extremely high conductivity than that of the cermet described in the above U.S. Pat. No. 5,261,944.

The nickel cermet of the present invention consists of from 35 to 70% by weight of a metal nickel phase and 65 to 30% by weight of a zirconium oxide (zirconia) phase stabilized in cubic form by 5 to 20 moles of yttrium oxide (yttria) for each 100 moles of zirconium oxide, the two phases, upon X ray diffractometric analysis, being distinct and homogeneously distributed, and is obtained by a preparation process comprising the following steps:

a) preparation of a suspension of zirconia stabilized by yttria (YSZ), by dispersing zirconia stabilized by yttria (YSZ), having a particle size of between 1 and 40 m$\mu$, preferably between 15 and 20 m$\mu$, in dimineralized water;

b) preparation of a solution of nickel by dissolving a hydrosoluble and thermodecomposable nickel salt in demineralized water;

c) mixing of the nickel solution with the dispersion obtained in step (a) and homogenization of the resulting dispersion by magnetic stirring for a time of between 5 and 40 minutes, preferably between 10 and 30 minutes;

d) elimination of the water from the dispersion obtained in step (c) by a system capable of operating without, or basically without, decomposition phenomena obtaining a solid consisting of particles of zirconia stabilized by yttra (YSZ) covered with the nickel salt;

e) calcination under oxidating conditions of the solid obtained in step (d) to cause the formation of a solid consisting of particles of YSZ covered with nickel oxide;

f) treatment with hydrogen of the solid obtained in step (e) to reduce the nickel oxide to metal nickel.

This nickel cermet normally has a surface percentage covered by nickel of between 4 and 30 or more.

The hydrosoluble and thermodecomposable nickel salts used to form the nickel solution can be selected from all the salts of carboxylic acids and nitrate salts: $Ni(CH_3COO)_2 6H_2O$ and $Ni(NO)_3 6H_2O$ are particularly suitable.

The solution of the nickel salt and the dispersion of zirconia stabilized by yttria are prepared and then mixed so as to have in the nickel cermet finally obtained, from 35 to 70% by weight of metal nickel and from 65 to 30% by weight of zirconium oxide stabilized by from 5 to 20 moles of yttrium oxide for every 100 moles of zirconium oxide.

According to the present invention, the water is eliminated (step d) from the dispersion obtained in step (c), as specified above, under such temperature conditions as to basically avoid decomposition. In particular it is possible to operate by evaporating the water under vacuum at a temperature of not more than 80° C., operating for example with a rotating evaporator. According to another embodiment, the water is eliminated by the spray-drying technique feeding the dispersion with a composition having a weight of about 5 to about 30% (w/w) into a spray-drying apparatus in equicurrent or countercurrent with an inert gas, such as $N_2$, or air. The gas flow entering the spray-dryer will generally have a temperature of about 150–300° C., preferably 170–200° C., and the out-going current a temperature of about 90–200° C., preferably 130–170° C. According to another method, the water is eliminated by the use of a vacuum freeze dryer.

In any case a solid, porous and friable, generally ochregreen coloured solid is separated from the water removal step.

According to the present invention, the solid thus obtained is subjected to calcination, in step (e) of the process, operating at high temperatures and in an oxidating environment. In particular suitable calcination temperatures are generally between 800 and 1000° C. and the calcination times can vary from 1 to 10 hours. According to a preferred embodiment the temperatures are about 900° C. and the time 3–5 hours.

The oxidating environment can consist of oxygen, air or air enriched with oxygen. Operating under these conditions the combustible or decomposable fraction is eliminated from the solid and there is the formation of metal oxides present (Ni).

This solid is subjected to treatment with hydrogen in step (f) of the process, to reduce NiO to metal Ni and therefore obtain the cermet. In particular the reduction is carried out by putting the solid in contact with gaseous hydrogen operating at temperatures within the range of 20 and 1000° C. to obtain the complete, or almost complete, reduction of the NiO to metal Ni. Useful reduction times are about 1–3 hours.

In this way the Ni cermet of the present invention is obtained, which generally contains 35–70% by weight of a metal nickel phase and 65–30% by weight of a Zr oxide (zirconia) phase stabilized in cubic form with yttrium oxide (yttria).

A further aspect of the present invention relates to the use of the nickel cermet described above as anodic material for solid oxide fuel cells (SOFC).

In particular this anode can be obtained by applying, with the known techniques, the nickel cermet of the present invention to a solid electrolyte of zirconium oxide stabilized with yttrium oxide. According to a particular embodiment the NiO/YSZ obtained after calcination in step (e) of the process, is applied to the solid electrolyte, followed by the reduction "in situ" of the nickel oxide to metal nickel.

The following example illustrates the invention but does not limit its scope in any way.

EXAMPLE 147.15 g of $Ni(NO_3)_2 6H_2O$ are dissolved in 400 g of demineralized water. This solution is added to a dispersion consisting of 16.280 g of YSZ (produced or commercially available, having the desired particle size). The resulting dispersion is charged into a rotating evaporator and the solvent is evaporated operating at 80° C. and 70 mm of Hg. About 164 g of porous and friable green solid residue are recovered. The solid is calcined in a muffle at 900° C. for 4 hours in an air flow. 53.3 g of a solid are recovered which, upon X-ray diffraction analysis of the powders, proves to consist of NiO and YSZ without other significant crystalline phases. The content of Ni in the solid is equal to 56.6% by weight.

The calcined solid is also subjected to X-ray mapping (STEM) which enables, on a submicronic level, the crystalline phase distribution present to be examined. It is thus determined that the Nickel oxide is distributed to cover the YSZ particles.

A portion of the calcined solid is used to form a pellet subsequently reduced, by means of the known technique, at 1000° C. with hydrogen. The cermet pellet thus obtained has an electric conductivity value at 1000° C. equal to 2500 S/cm.

We claim:
1. A process for preparing a nickel cermet consisting essentially of:
   35 to 70% by weight of a metal nickel phase, and
   65 to 30% by weight of a zirconium oxide phase,
      wherein said zirconium oxide is stabilized in cubic form by 5 to 20 moles of yttrium oxide for each 100 moles of said zirconium oxide, and
   the metal nickel and zirconium oxide phases, upon X ray diffraction analysis are distinct and homogeneously distributed,
   said process comprising:
      a) dispersing zirconia stabilized by yttria having a particle size of between 1 and 40 μm, in demineralized water to prepare a suspension;
      b) dissolving a hydrosoluble and thermodecomposable nickel salt in demineralized water to prepare a solution;
      c) mixing the nickel solution with the suspension and homogenizing the resulting dispersion by magnetic stirring for a time of between 5 and 40 minutes;
      d) eliminating the water from the dispersion by a system capable of operating without, or almost without, decomposition phenomena to obtain a solid consisting essentially of particles of zirconia stabilized by yttria covered with the nickel salt;
      e) calcining under oxidating conditions the solid to cause the formation of a solid consisting essentially of particles of zirconia stabilized by yttria covered with nickel oxide; and
      f) treating with hydrogen the solid obtained in step (e) to reduce the nickel oxide to metal nickel and obtain the nickel cermet.

2. The process according to claim 1 wherein the suspension has a particle size distribution of between 15 and 20 μm.

3. The process according to claim 1 wherein the stirring is carried out for a time of between 10 and 30 minutes.

4. The process according to claim 1 wherein the hydrosoluble and thermodecomposable nickel salts are selected from the salts of carboxylic acids or nitrate salts.

5. The process according to claim 4 wherein the salt of carboxylic acid is $Ni(CH_3COO)_2 6H_2O$.

6. The process according to claim 4 wherein the nitrate salt is $Ni(NO)_3 6H_2O$.

7. The process according to claim 1 wherein the eliminating of the water, according to step (d), from the dispersion obtained in step (c), is carried out either operating under vacuum at a temperature of not more than 80° C., or by spray drying or with the use of a vacuum freeze dryer.

8. The process according to claim 1 wherein the calcining is carried out at a temperature of between 800 and 1000° C. in a time of from 1 to 10 hours in an environment of oxygen, air or air enriched with oxygen.

9. The process according to claim 8 wherein the calcining is carried out at about 900° C. for a time of 3–5 hours.

10. The process according to claim 1 wherein the treating, in step (f), is carried out by putting the calcined solid in contact with gaseous hydrogen, operating at temperatures within the range of 20 to 1000° C.

* * * * *